United States Patent
Teletia et al.

(10) Patent No.: US 9,684,607 B2
(45) Date of Patent: Jun. 20, 2017

(54) AUTOMATIC RECOVERY OF APPLICATION CACHE WARMTH

(71) Applicant: Microsoft Technology Licensing, LLC, Redmond, WA (US)

(72) Inventors: Nikhil Teletia, Madison, WI (US); Jae Young Do, Madison, WI (US); Kwanghyun Park, Madison, WI (US); Jignesh M. Patel, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 14/631,695

(22) Filed: Feb. 25, 2015

(65) Prior Publication Data

US 2016/0246735 A1    Aug. 25, 2016

(51) Int. Cl.
*G06F 12/00* (2006.01)
*G06F 12/122* (2016.01)
(Continued)

(52) U.S. Cl.
CPC .......... *G06F 12/122* (2013.01); *G06F 8/4442* (2013.01); *G06F 8/67* (2013.01);
(Continued)

(58) Field of Classification Search
CPC ............. G06F 12/0811; G06F 12/0862; G06F 12/0875; G06F 12/128; G06F 2212/283; G06F 2212/69
(Continued)

(56) References Cited

U.S. PATENT DOCUMENTS

| 6,021,480 A * | 2/2000 | Pettey ................ G06F 12/0886 710/314 |
| 6,549,210 B1 * | 4/2003 | Van Hook ........... G06F 12/0875 345/557 |

(Continued)

FOREIGN PATENT DOCUMENTS

| CN | 101470645 A | 7/2009 |
| CN | 102012849 A | 4/2011 |

(Continued)

OTHER PUBLICATIONS

"International Search Report and Written Opinion issued in PCT Application No. PCT/US2016/018999", Mailed Date: May 6, 2016, 12 pages.

(Continued)

*Primary Examiner* — Mardochee Chery
(74) *Attorney, Agent, or Firm* — Workman Nydegger (57) ABSTRACT

The automated recovery of the warmth of cache of an application that has been subject to a running state change that degraded the warmth of the cache. To prepare for a loss in warmth, the state of a cache portion identifiers are captured. Such identifies the cache portions that are within the application cache at an instant in time. Thereafter, the application experiences a change in running state that diminishes the warmth of the application cache. For instance, the application might be stopped and restarted. After and despite this cache degradation, the application may continue to operate. However, in order to warm the application cache more quickly, while the application is operating, the application cache is automatically warmed. For instance, while the application is operating, cache portions identified by the captured cache portion identifiers are automatically accessed from a source that is external to the application cache.

20 Claims, 10 Drawing Sheets

(51) Int. Cl.
*G06F 12/0811* (2016.01)
*G06F 12/128* (2016.01)
*G06F 12/0862* (2016.01)
*G06F 12/0875* (2016.01)
*G06F 9/45* (2006.01)
*G06F 9/445* (2006.01)
*G06F 9/46* (2006.01)
*G06F 9/48* (2006.01)

(52) U.S. Cl.
CPC .............. *G06F 9/461* (2013.01); *G06F 9/485* (2013.01); *G06F 9/4856* (2013.01); *G06F 12/0811* (2013.01); *G06F 12/0862* (2013.01); *G06F 12/0875* (2013.01); *G06F 12/128* (2013.01); *G06F 2212/283* (2013.01); *G06F 2212/69* (2013.01)

(58) Field of Classification Search
USPC ........................................................ 711/122
See application file for complete search history.

(56) References Cited

U.S. PATENT DOCUMENTS

| | | | |
|---|---|---|---|
| 7,533,215 | B2 | 5/2009 | Faber |
| 8,489,815 | B2 | 7/2013 | Iyigun et al. |
| 8,521,959 | B2 | 8/2013 | Zhang et al. |
| 8,612,383 | B2 | 12/2013 | Sandhu |
| 8,738,579 | B2 | 5/2014 | Huras et al. |
| 9,114,758 | B1 | 8/2015 | Poudrier |
| 2004/0024969 | A1* | 2/2004 | Chauvel .............. G06F 12/0253 711/132 |
| 2005/0144398 | A1* | 6/2005 | Hammarlund .......... G06F 9/383 711/145 |
| 2007/0005883 | A1 | 1/2007 | Trika |
| 2008/0256298 | A1 | 10/2008 | Lu et al. |
| 2010/0114919 | A1 | 5/2010 | Sandhu |
| 2010/0169497 | A1 | 7/2010 | Klimentiev |
| 2010/0318584 | A1 | 12/2010 | Krishnaprasad et al. |
| 2011/0148895 | A1 | 6/2011 | Burckart et al. |
| 2011/0197046 | A1 | 8/2011 | Chiu et al. |
| 2012/0173819 | A1 | 7/2012 | Solihin |
| 2014/0229676 | A1 | 8/2014 | Biswas et al. |
| 2014/0372703 | A1* | 12/2014 | Ricketts .............. G06F 12/0897 711/133 |
| 2015/0039717 | A1 | 2/2015 | Chiu et al. |
| 2016/0011938 | A1 | 1/2016 | Koseki |
| 2016/0232077 | A1* | 8/2016 | Hu ...................... G06F 11/3632 |
| 2016/0246735 | A1* | 8/2016 | Teletia .................. G06F 12/122 |

FOREIGN PATENT DOCUMENTS

| | | |
|---|---|---|
| CN | 102043727 A | 5/2011 |
| JP | H11110301 A | 4/1999 |
| WO | 2014100253 A1 | 6/2014 |

OTHER PUBLICATIONS

"Second Written Opinion Issued in PCT Application No. PCT/US2016/019000", Mailed Date: Jul. 28, 2016, 6 Pages.

"Second Written Opinion Issued in PCT Application No. PCT/US2016/018999", Mailed Date: Aug. 2, 2016, 6 Pages.

"International Search Report and Written Opinion Issued in PCT Application No. PCT/US2016/019000", Mailed Date: May 2, 2016, 11 Pages.

Office Action dated Nov. 4, 2016 issued in U.S. Appl. No. 14/631,698.

"International Preliminary Report on Patentability Issued in PCT Application No. PCT/US2016/018999", Mailed Date: Dec. 1, 2016, 7 Pages.

"Cache Warming", Retrieved on: Dec. 17, 2014 Available at: http://infocenter.sybase.com/help/index.jsp?topic=/com.sybase. help.sqlanywhere.12.0.1/dbusage/perform-s-4988196.html.

Das, et al., "Albatross: Lightweight Elasticity in Shared Storage Databases for the Cloud using Live Data Migration", In Proceedings of Very Large Database Endowment, vol. 4, Issue 8, May 2011, pp. 494-505.

Barr, Jeff, "MySQL Cache Warming for Amazon RDS", Published on: Sep. 3, 2014 Available at: http://aws.amazon.com/blogs/aws/rds-mysql-cache-warming/.

Ng, et al., "Integrating Reliable Memory in Databases", In International Journal on Very Large Data Bases, vol. 7, Issue 3, Aug. 1998, pp. 194-204.

Notice of Allowance dated Feb. 27, 2017 issued in U.S. Appl. No. 14/631,698.

* cited by examiner

AUTOMATIC RECOVERY OF APPLICATION CACHE WARMTH

BACKGROUND

The amount of information available to users over the Internet or via corporate networks is practically limitless, which is why today's era is often termed the "information age". While computing hardware provides the hardware support for computers, it is the applications that direct the operation of the hardware to perform myriad functions. In order to support the information age, such applications require access to information, often referred to as data.

For best performance, data is often present in a hierarchy, with more often and/or recently used data being cached more locally with higher access speeds and with lesser used data being made available outside of the cache with slower access speeds. The recency and/or frequency of data access is often predictive of future accesses of the data, and is often referred to with analogous references to temperature (such as "warmth", "hotness", "coolness", "temperature"). For instance, the hotter a gas molecule is, the more frequently and aggressively it interacts with surrounding molecules. Accordingly, the temperature metaphor has been widely adopted for use with data accesses.

As an application interacts with underlying data store hierarchies, the application builds up a cache, allowing the application to approach peak performance as warm data is loaded into the more efficiently accessed cache. If the data within the cache is lost, application performance is degraded, but slowly recovers until the cache is once again populated with warm data. Typically, the re-population of the cache is accomplished via as the application engages in normal application workflows. Alternatively, skilled users may manually warm the cache by requesting data that they are able to predict will be used.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the recovering of the warmth of a cache of an application that has been subject to a running state change that degraded the warmth of the cache. The "warmth" of data refers to how often and/or recently data has been accessed and thus is often considered predictive of future likelihood and immanency of access. In order to prepare for a loss in warmth, the state of a cache portion identifiers are captured. Such identifies the cache portions that are within the application cache at an instant in time.

Thereafter, the application experiences a change in running state that diminishes the warmth of the application cache (e.g., through loss in data). For instance, the application might be stopped and restarted. Otherwise, the application might experience a role change, such as from secondary to primary. Alternatively or in addition, the application may be moved from one machine to another. After changing the running state of the application, the application may continue to operate despite the degraded warmth of the application cache. However, in order to warm the application cache more quickly, while the application is operating, the application cache is automatically warmed.

For instance, while the application is operating, cache portions identified by the captured cache portion identifiers are automatically accessed from a source that is external to the application cache, and placed into the application cache, even though the business logic of the application itself did not all for them to be read. Thus, the application cache can automatically become warmer faster. Thus access speeds are quickened for the application, thereby improving application performance. The application cache is automatic warmed, although such automatic warmth may happen in response to a user instruction to warm the application cache. Alternatively, even the determination that the application cache is to be warmed is automatic.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the recovering of the warmth of a cache of an application that has been subject to a running state change that degraded the warmth of the cache. The "warmth" of data refers to how often and/or recently data has been accessed and thus is often considered predictive of future likelihood and immanency of access. In order to prepare for a loss in warmth, the state of a cache portion identifiers are captured. Such identifies the cache portions that are within the application cache at an instant in time.

Thereafter, the application experiences a change in running state that diminishes the warmth of the application cache (e.g., through loss in data). For instance, the application might be stopped and restarted. Otherwise, the application might experience a role change, such as from secondary to primary. Alternatively or in addition, the application may be moved from one machine to another. After changing the running state of the application, the application may continue to operate despite the degraded warmth of the application cache. However, in order to warm the application cache more quickly, while the application is operating, the application cache is automatically warmed. For instance, while the application is operating, cache portions identified by the captured cache portion identifiers are automatically accessed from a source that is external to the application cache, and placed into the application cache, even if the business logic of the application itself did not all for them to be read. Thus, the application cache can automatically become warmer faster. Thus access speeds are quickened for the application, thereby improving application performance. The application cache is automatic warmed, although such automatic warmth may happen in response to a user instruction to warm the application cache. Alternatively, even the determination that the application cache is to be warmed is automatic.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
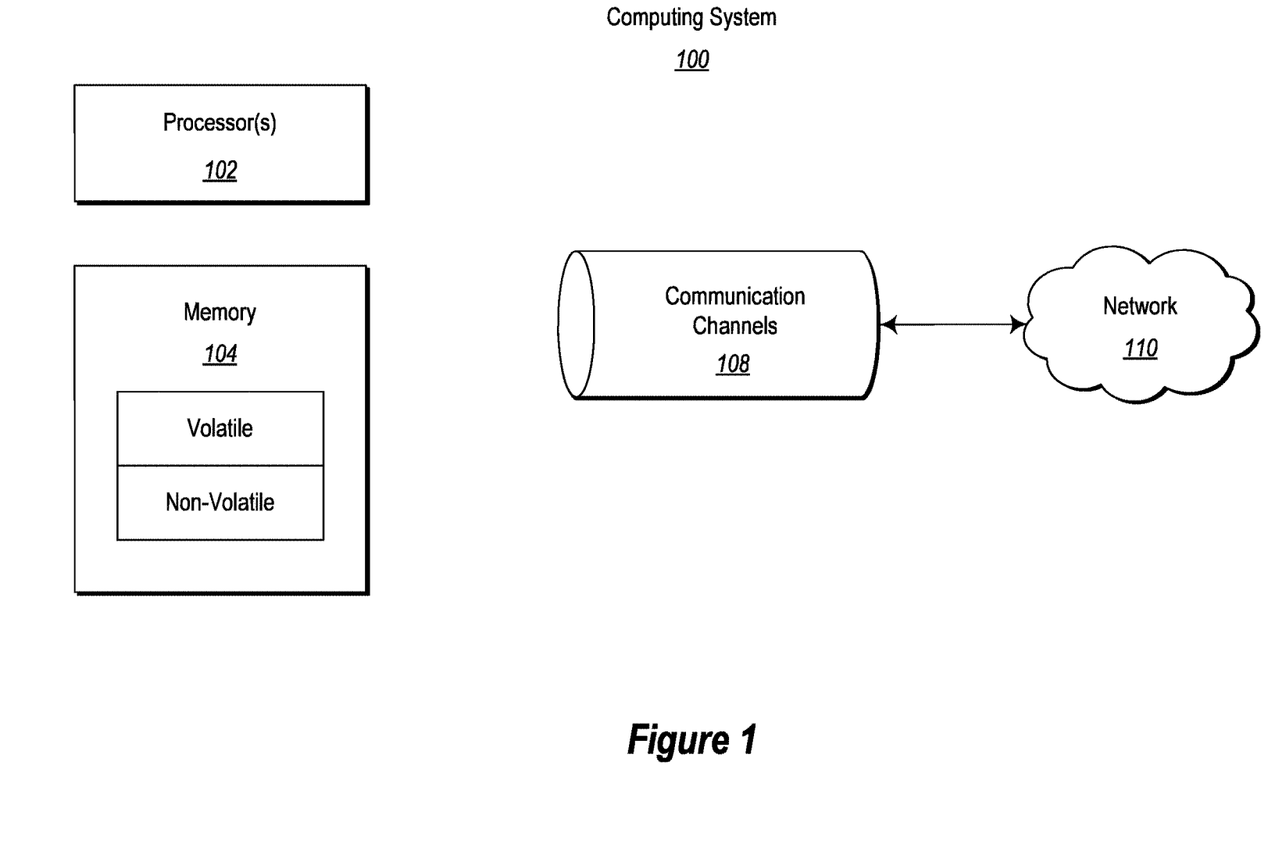
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2A:
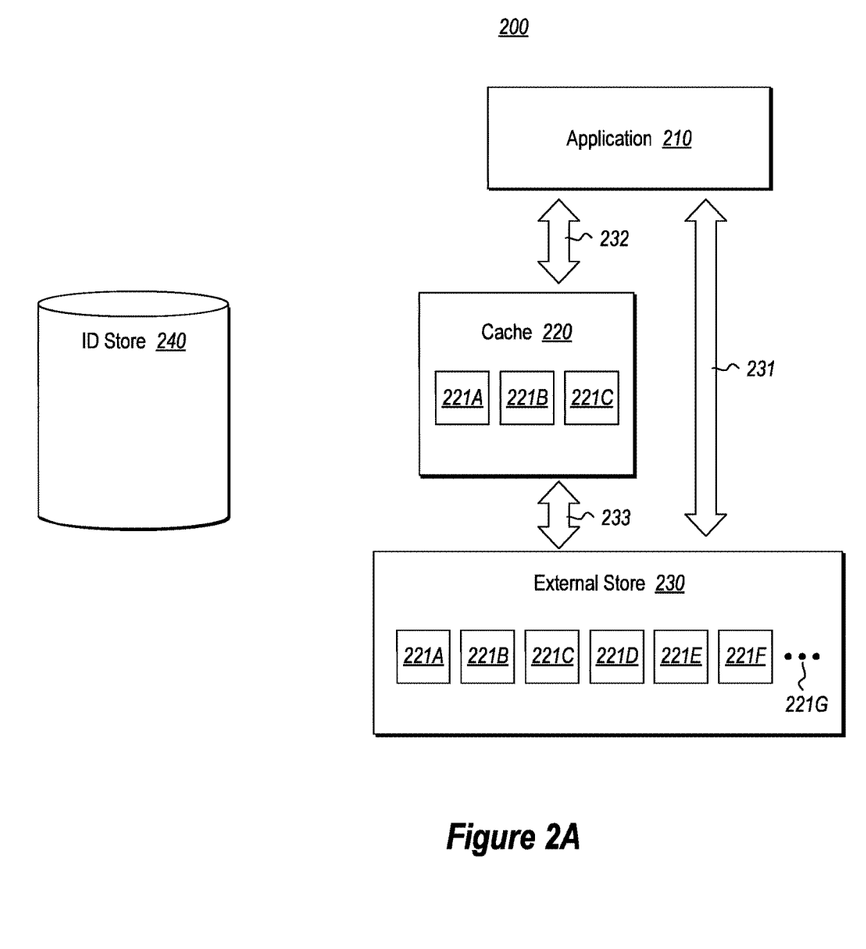
FIG. 2A illustrates an environment at an instant in time in which there is an operating application, a populated application cache, a populated external store, and an unpopulated identifier store.

FIG. 2A illustrates an environment 200 at an instant in time. As time moves forward, the environment 200 will change as described an illustrated with respect to FIGS. 2B through 2G. However, at least at the instant of time of FIG. 2A, the environment 200 includes an application 210, an application cache 220, an external store 230, and an identifier store 240. The environment 200 may be embodied in a computing system such as the computing system 100 of FIG. 1.

The application 210 may be any software that uses data such as, for example, a database application, a virtual machine, or an operating system. However, the principles described herein are not limited to the particular type of application, but may be extended to any application that uses data.

The application cache 220 may be a volatile cache or a non-volatile cache. For instance, in a distributed environment, there may be data remotely located that is to be accessed into a local cache. An example of this might a cloud environment which tends to be divided into storage nodes and compute nodes. In that case, the compute node or otherwise any local computing system might have a local disk (which is non-volatile), as well as perhaps a memory (which may be volatile or perhaps also non-volatile). In either case, moving data from a remote location into the local computing system is indeed caching that data since it may later be more efficiently accessed locally. In addition, moving data from a local disk to a local memory may also be viewed as caching the data.

In any case, the application cache 220 includes cache portions that represent data that has been cached into the application cache for later retrieval. The cache portions may be identified in sections that map to the underlying storage/memory that supports the application cache 220. For instance, the cache portions might be data pages. The principles described herein are not limited in any way to the number of identity of cache portions that are included within the application cache. However, suppose at the instant in time represented in FIG. 2A, that there are three cache portions 221A, 221B and 221C within the application cache 220.

The environment 200 also includes an external store 230 that is also capable of storing cache portions, and that is "external" in the sense that it is external to the application cache 220. For instance, the external store 230 also includes cache portions 221A, 221B and 221C. In fact, the application 210 may very well have acquired the instances of cache portions 221A, 221B and 221C that are presently within the application cache 220 from the external store 230. However, the external store 230 may include any number of additional cache portions as well such as cache portions 221D, 221E, 221F as well as potentially many others as represented by the ellipses 221G. The application 210 is capable of at least reading from and potentially writing to the external store 230 as represented by the bi-directional arrow 231. The application 210 is also capable of reading from and writing to the application cache 220 as represented by the bi-direction arrow 232. The application cache 220 may also be capable of accessing data from the external store 230 as represented by arrow 233. In one example, the external store 230 is on a different machine than the application 210. For instance, in a cloud computing environment, the external store 230 might be on a storage node, whereas the application 210 and application cache 220 might be on a compute node.

The environment 200 also includes an identifier store 240. The identifier store 240 is illustrated as empty for now, but is for purposes of storing cache portion identifiers, and not necessarily the cache portions themselves. In accordance with the principles described herein, the application identifiers within the identifier store 240 are used to re-warm the application cache 220 with cache portions from the external store 230. As will be described further below, the external store 230 serves as a source from which the application cache 220 may be automatically re-warmed with cache pages that are likely to be used in case the application cache 220 loses its cache pages or otherwise does not properly include the cache pages that it should due to some running state change in the application 210. Accordingly, the suitability of the hardware that supports the external store 230 and the identifiers store 240 is chosen such that the cache page identifiers remain in the identifier store 240, and the cache portions remain within the external store 230 in case of the running state change that is to be protected against.

For instance, protection against the running state change means that the environment 200 is capable of rewarming the application cache 220 (i.e., loading warm cache portions back into the application cache 220) in case of the running state change. In one example, the external store 230 and the identifier store 240 are on the same storage system.

Figure 3:
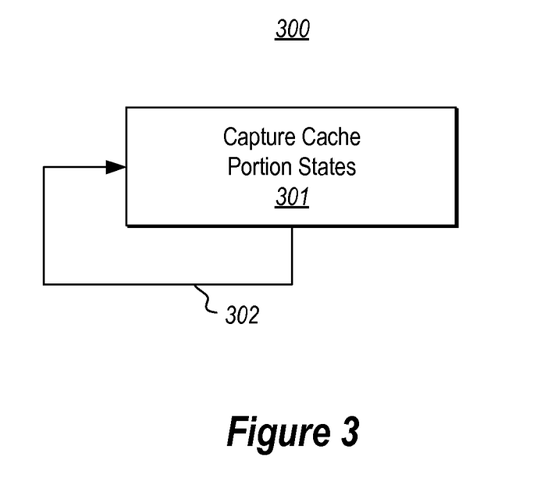
FIG. 3 illustrates a flowchart of a method for preparing to recover warmth of a cache of an application in case that application is subject to a running state change that results in data being lost from the cache.

FIG. 3 illustrates a flowchart of a method 300 for preparing to recover warmth of a cache of an application that has been subject to a running state change. The method 300 includes capturing a state of cache portions that are within the application cache (act 301) of the application at an instant in time. The captured state of cache portion is not the cache portion itself, but metadata about the cache portion, including an identifier of the cache portion. There may be a captured state of cache portion for each of the cache portions in the application cache 220. In one embodiment, the application cache 220 is volatile memory and capturing the cache portion state involves placing the metadata about the cache portion into non-volatile memory and/or storage. The application cache 220 might also be non-volatile. Regardless of whether the application cache 220 is volatile and/or non-volatile capturing the metadata about the cache portion state may involve the use of an identifier store 240 that is not within the same physical machine as the application cache 220.

Figure 4:
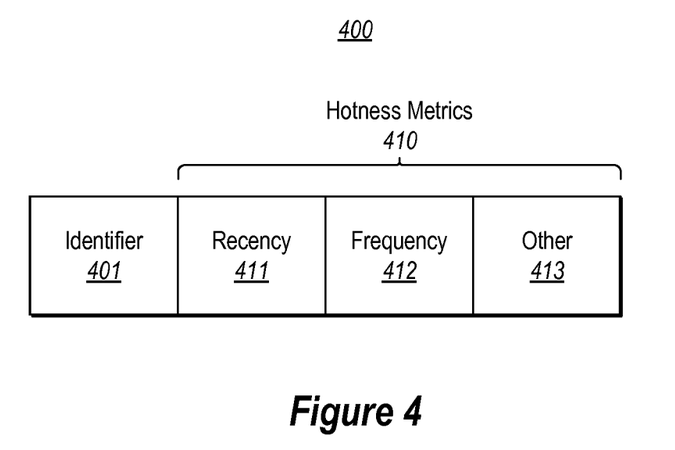
FIG. 4 illustrates a captured cache portion state that includes a cache portion identifier for the associated cache portion, as well as hotness metrics for the associated cache portion.

FIG. 4 illustrates a captured cache portion state 400 that includes a cache portion 401 identifier for the associated cache portion. In addition the cache portion state 400 may optionally include one or more hotness metrics 410 for the associated cache portion. The "hotness" metrics refers to metrics that correlate to a likelihood that the cache portion may be accessed by the application 210 in the near future. As temperature references a frequency and likelihood of interaction of one gaseous molecule with another, temperature has also been adopted in the field of data access to represent likelihood that data will be accessed by an application. Of course, the determination of the warmth, hotness, or temperature of a portion of data is an approximate estimation, and not necessarily deterministic, and is not a function of the data itself, but a function of how an application has historically interacted with data. Data that is hot with respect to one application may be cool with respect to another application.

As an example only, in FIG. 4, the hotness metrics 410 are illustrated as including a recency field 411 that defines how recently the associated cache portion has been accessed by the application, a frequency field 412 that defines how frequently the cache portion has been accessed, as well as potentially other fields 413 as represented by field 413. There is a captured cache portion state 400 for each of the cache portions within the application cache 200. For instance, for FIG. 2, there may be a cache portion state 400 for each of the cache portions 221A, 221B and 221C. That capture cache portion state 400 for each cache portion in the application cache 220 may be captured in the identifier store 240.

Figure 2B:
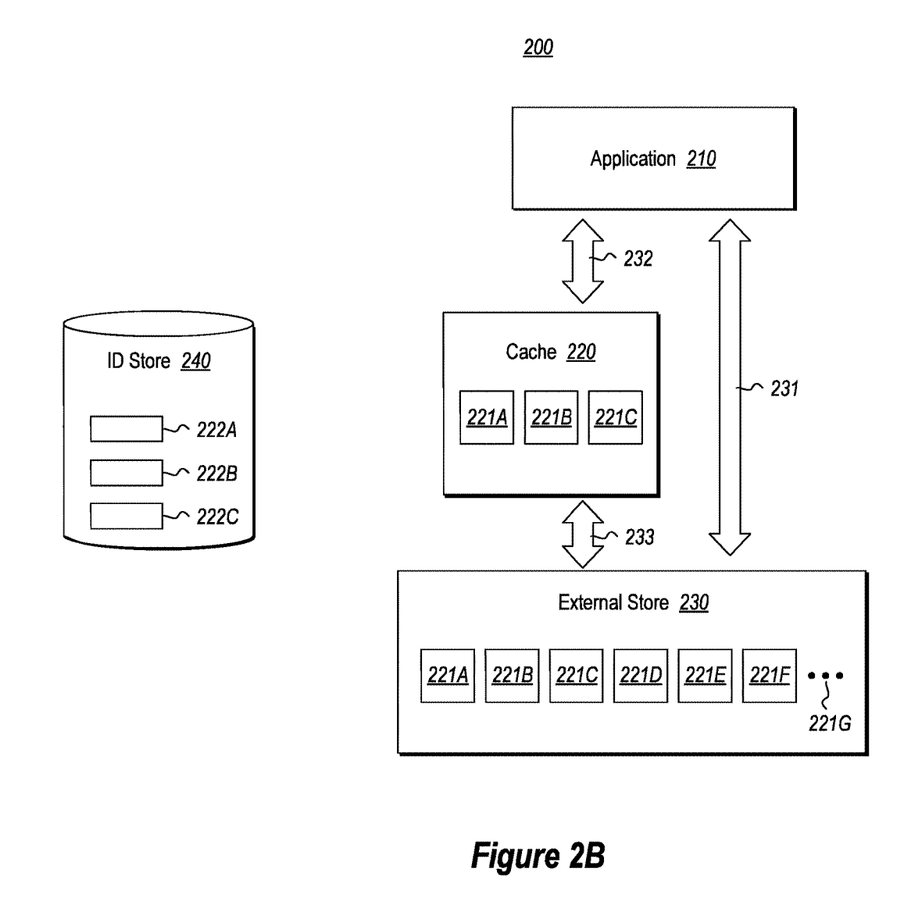
FIG. 2B illustrates the environment of FIG. 2A, except with metadata states regarding the cache portions within the application cache now captured within the identifier store.

FIG. 2B illustrates a state of the environment 200 after a cache portion state 222A, 222B and 222C (for each of the corresponding cache portions 221A, 221B and 221C within the application cache 220) are captured within the identifier store 240. FIG. 2B is essentially the same as FIG. 2A except for these captured states 222A, 222B and 222C now showing as present within the identifier store 240. Recall again, that the cache portion state 222A is not the cache portion 221A itself, but is merely metadata about the cache portion 221A including an identifier for the cache portion 221A, as well as potentially hotness metrics for the cache portion 221A. The same may be said of cache portions state 222B and 222C, with respect to cache portions 221B and 221C.

In the case of an anticipated change in running state of the application, the act 301 might be performed immediately prior to, or atomically with, the change in running state of the application. For instance, the change in running state might be that the application 210 is to be migrated from one physical machine to another physical machine, or that the application 210 is to be upgraded, and thus the application's workload is transferred to another instance of the application 210 running on the same or a different physical machine.

Alternatively or in addition, however, the running state of the application might not be anticipated at all, such as a software failure of the application or even perhaps a hardware failure or power loss of the physical machine on which the application 210 runs. In that case, the method 300 may be repeated as represented by arrow 302 such that the cache portion states within the identifier store 240 are updated (act 301) on a regular basis. For instance, the identifier store 240 may be updated (act 301) periodically, and/or in response to certain events. These updates may thus represent snapshots of the metadata of the cache portions in the application cache. If an unanticipated failure were to occur, and the application 210 thus stop running, the latest snapshot within the identifier store 240 may be used, even though that latest snapshot might not be completely up-to-date.

Figure 5:
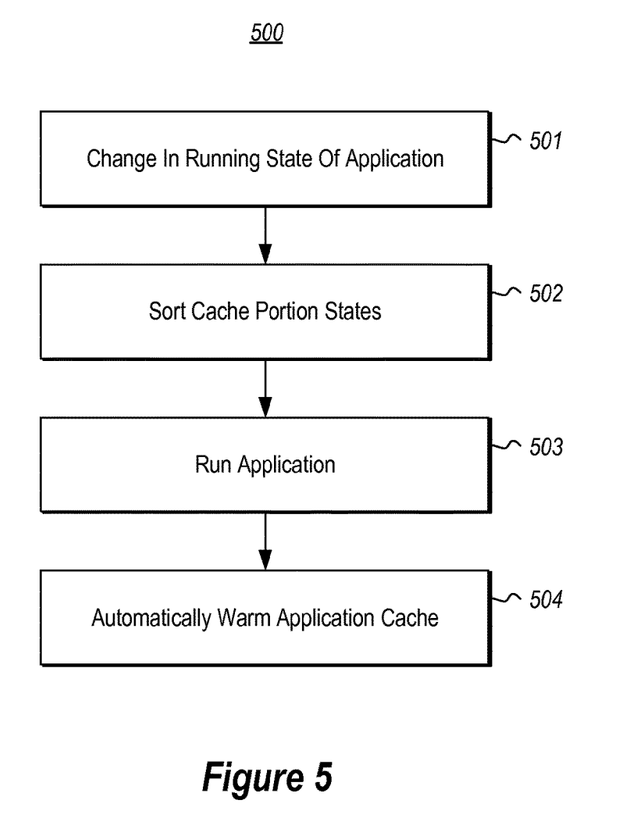
FIG. 5 illustrates a flowchart of a method for responding to a change in running state of the application by automatically recovering warmth of the cache of the application.

FIG. 5 illustrates a flowchart of a method for responding to a change in running state of the application by automatically recovering warmth of the cache of the application. The method 500 is performed in the context in which the identifier store has cache portion state included therein for at least some of the cache portions that were within the application cache at the time that the running state change of the application occurred.

Figure 2C:
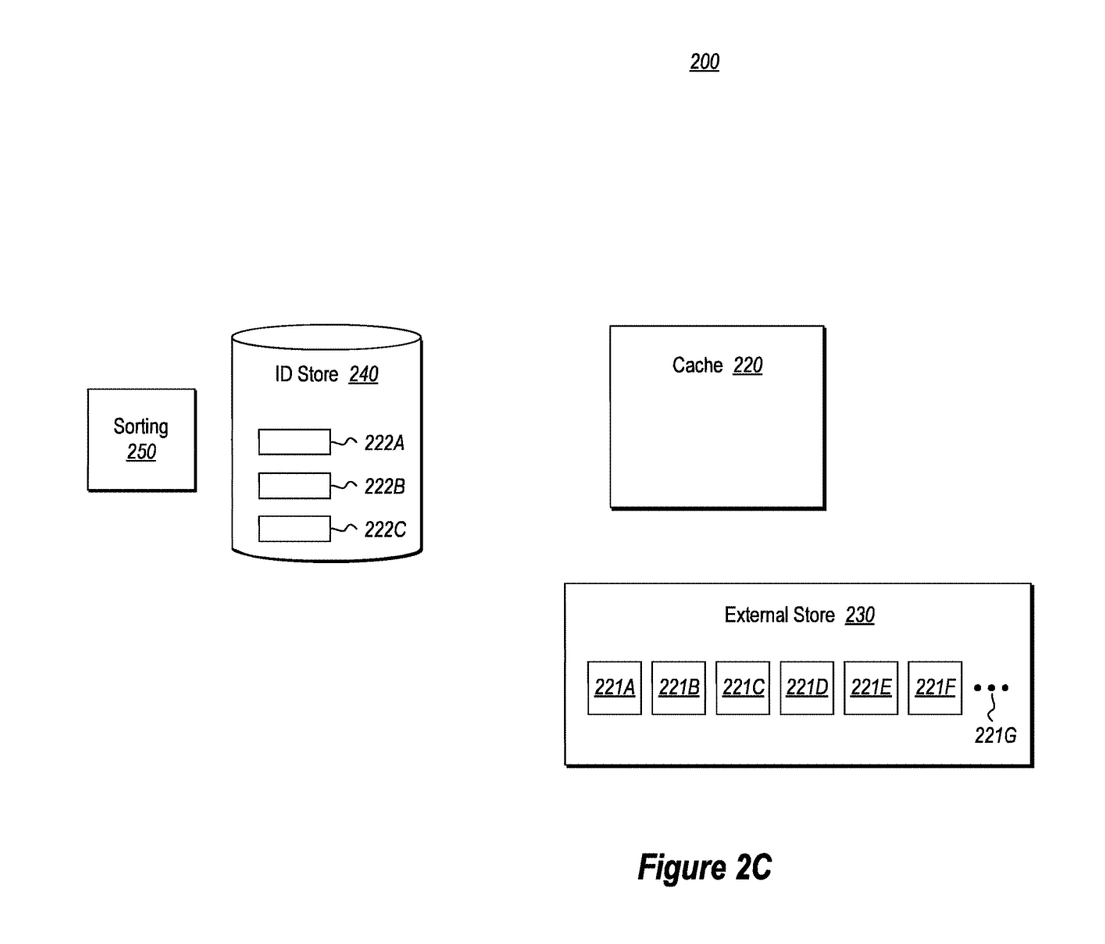
FIG. 2C illustrates the environment of FIG. 2B, except now with there being no application running, and with the cache portion within the application cache being lost due to a running state change of the application, but with the metadata state regarding those cache portions still being preserved within the identifier store, and with data remaining within the external store.

The method 500 is initiated upon occurrence of a change in running state of the application (act 501). In some cases, the change in running state might cause a complete loss of the cache portions within the application cache. For instance, in FIG. 2C, in response to the change in running state of the application 210, the cache portions within the application cache 220 are completely lost. As one example, perhaps the application cache 220 is volatile memory and there has been a power loss to the physical machine operating the application cache. Alternatively, regardless of whether the application cache 220 is non-volatile or volatile, perhaps the perhaps the application 210 is being moved from one physical machine to another physical machine. In that case, the application cache 220 at the new machine will be started with potentially no cache portions contained therein. FIG. 2C represents any one of these scenarios in which all of the cache portions within the application cache 220 have been lost. Thus, FIG. 2C is similar to FIG. 2B, except that there are no cache portions within the application cache 220. Furthermore, there is no application 210 presently shown as running at the instant in time illustrated in FIG. 2C to emphasize that the change in running state may result in a period of time in which the application 210 is not running. For instance, the application 210 might be being moved from one machine to another and/or in recovery.

In any of these situations in which the application has failed or is being migrated, or restarted, the cache portions in the application cache might no longer be considered warm. In fact, in the example of FIG. 2C, the application cache 220 no longer has any cache portions at all. Furthermore, this represents a running state change in which the application 210 is no longer running at all, and thus there is no application 210 shown in FIG. 2C either. Furthermore, in the case of the application might be moved from one machine to another machine, the application cache 220 of FIG. 2C might not even be on the same machine as the application cache 220 of FIGS. 2A and 2B.

In some embodiments, however, there might be at least some cache portions within the application cache even after the change in running state. For instance, suppose that there are multiple instances of the application running, with one application acting in a primary role, and the other one or more replica instances acting in a secondary role. Suppose further that in this environment, write requests are made to the application running in the primary role, whereas read requests may be made to any application running in either a primary or secondary role. If the applications each maintain an application cache, the application caches are not likely synchronized as they have experienced a different history or read and write requests. Accordingly, if the application having the primary role was to fail, and one of the applications acting in the secondary role were to undertake then undertake the primary role, the application cache of the application now acting in the primary role may not have the same warmth as the application cache that was acting previously in the primary role. In other words, the application cache of the application now acting in the primary role may have at least some different (but possibly some the same) cache portions as were in the application cache of the application that previously acted in the primary role.

Figure 2D:
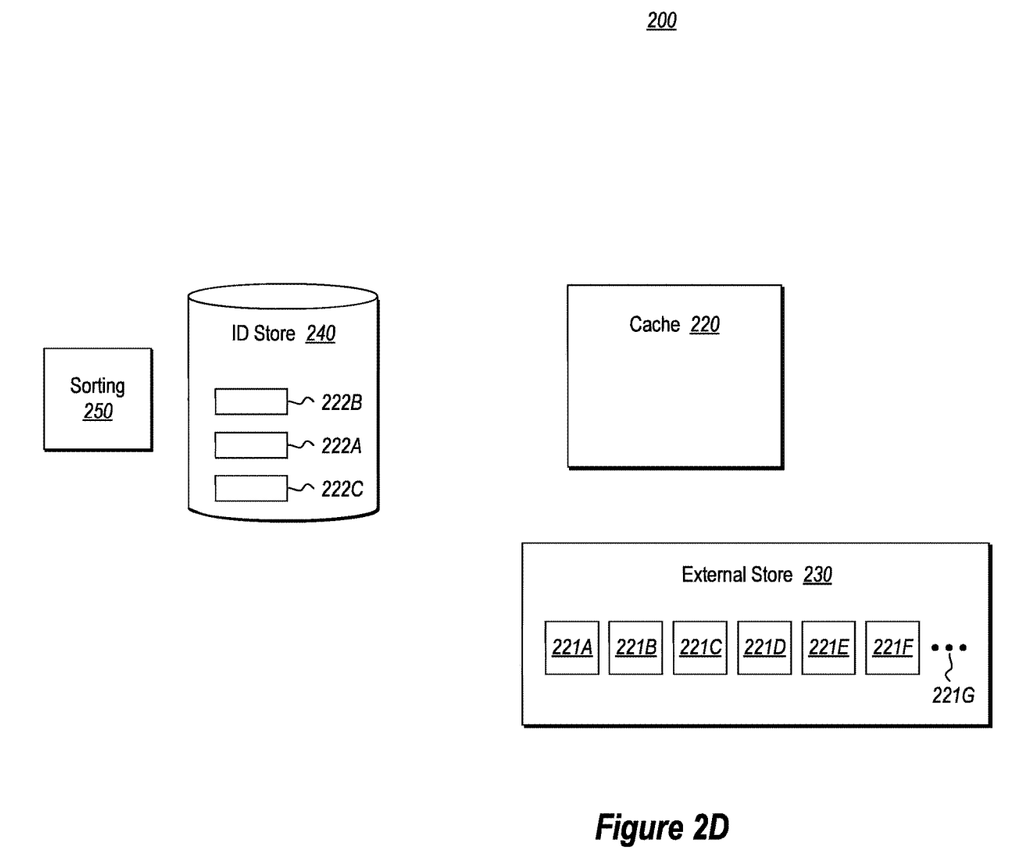
FIG. 2D illustrates a state of the environment of FIG. 2C, except now with the cache portion metadata state within the identifier store being sorted according to likelihood of imminent access of the corresponding cache portion by the application.

After the application has experienced a change in running state (act 501), optionally, the cache portion states are automatically sorted (act 502). For instance, in FIG. 2C, perhaps a sorting module 250 evaluates and sorts the cache portion states 222A, 222B and 222C in order of maximum benefit in loading the cache portions back into the application cache. Such maximum benefit might include increasing the speed of warming of the application cache. For instance, the sorting module 250 might optionally sort the cache portion identifiers using an estimated likelihood of imminent access by the application. This estimated likelihood of access might be determined based on the captured hotness metrics within the cache portion states 222A, 222B, and 222C. FIG. 2D illustrates a state of the environment 200 that is similar to that of FIG. 2C, except that the cache portion states 222A, 222B and 222C have now been sorted with cache portion state 222B being first, cache portion 222A being second, and cache portion 222C being third. This sorting operation (act 402) may be performed even before the application 210 becomes again operational. Accordingly, FIG. 2D still does not show that the application 210 is present.

In one embodiment, the sorting also considers whether the cache portions are grouped in the external store so as to consider whether reading of one of the cache portions renders reading of another of the cache portions to be faster or more efficient than otherwise without being grouped together. For instance, in sequential storage, if there are two pages that are located in close proximity, it is very efficient to read multiple sequentially addressed pages, as compared to just randomly reading one single addressed page after another. In other words, sequential storage is best for performing sequential reads, and less efficient at random access reads.

Figure 2E:
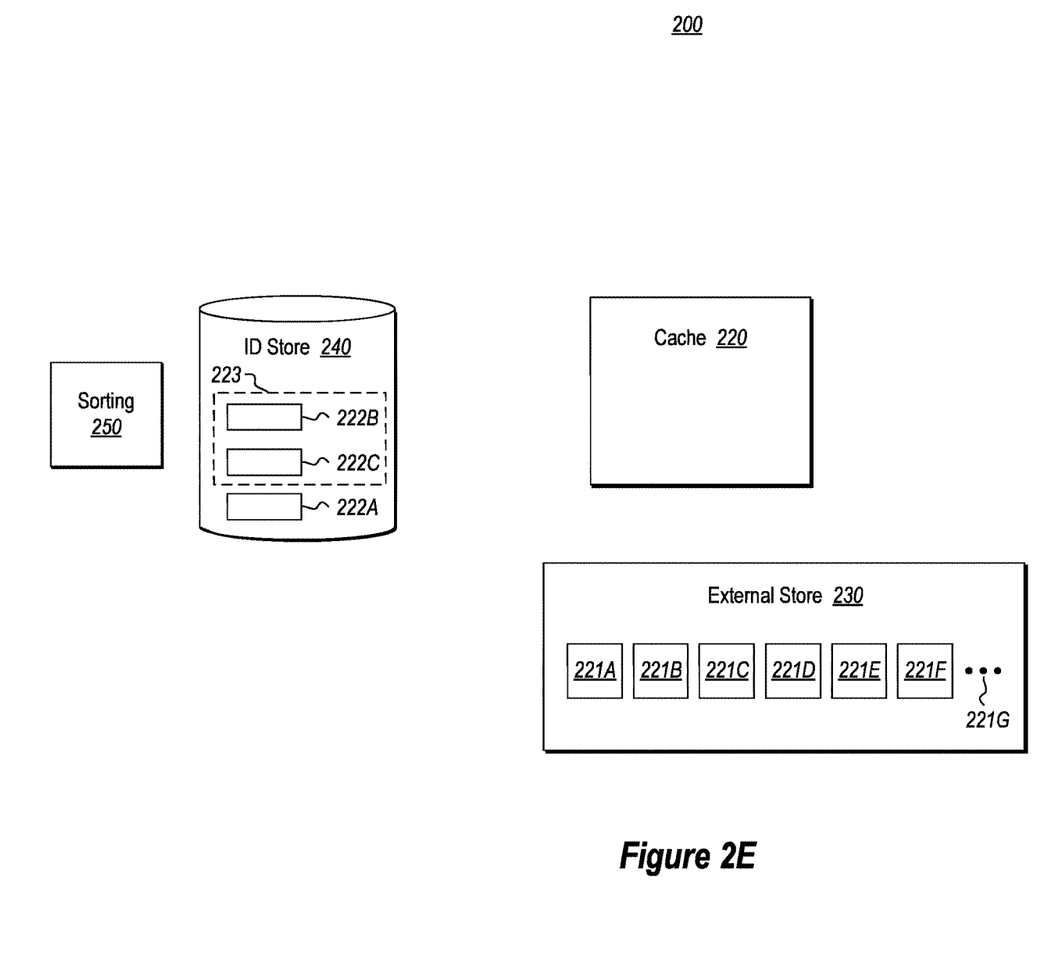
FIG. 2E illustrates a state of the environment of FIG. 2D, except now with the cache portion metadata state within the identifier store being sorted also according to grouping of the corresponding cache portions within the external store.
Figure 6:
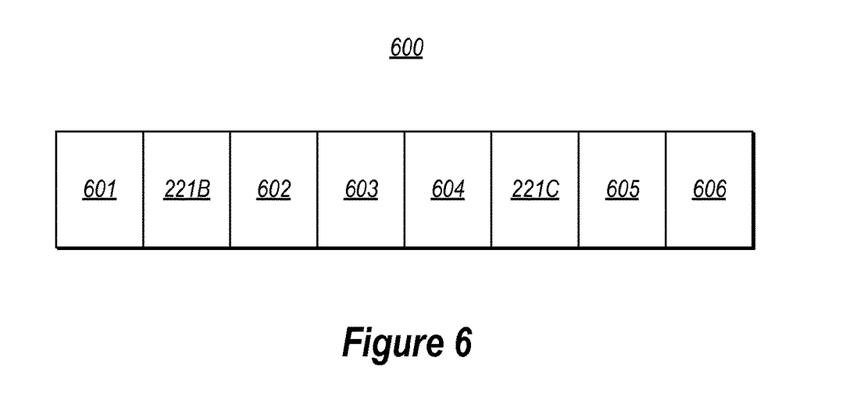
FIG. 6 illustrates an example sequence of pages that may be read from the external store in a single sequential read operation and which includes cache portions that are to be recovered into the application cache as well as portions that are not to be recovered into the application cache.

FIG. 6 illustrates an example sequence 600 of pages that may be read in a single sequential read operation from the external store. The sequence 600 happens to include two of the portions 221B and 221C that were previously in the application cache 220. Accordingly, although portion 221C is considered the coolest of the cache portions, and thus is sorted last in FIG. 2D, since portion 222B is to be recovered first anyway (being a much warmer cache portion and sorted highest), the sorting might still result in the recovering of the entire sequence 600 first, and then thereafter just disregard the portions 601 through 606 in the sequence 600 that were not previously in the application cache. In this manner, the warmest cache portion 221B may be recovered first, and another cache portion 221C (albeit the coolest) may be brought into the application cache 220 with minimal cost. FIG. 2E illustrates an environment in which the sorting module 250 has caused cache portion states 222B and 222C to be grouped together for first access (as represented by the dashed box 223), followed by the cache portion state 222A. This represents that when warming the application cache, the sequence 600 is to be accessed (and all but the cache portions 222B and 222C disregarded), and then the cache portion 222A is to be accessed.

Figure 2F:
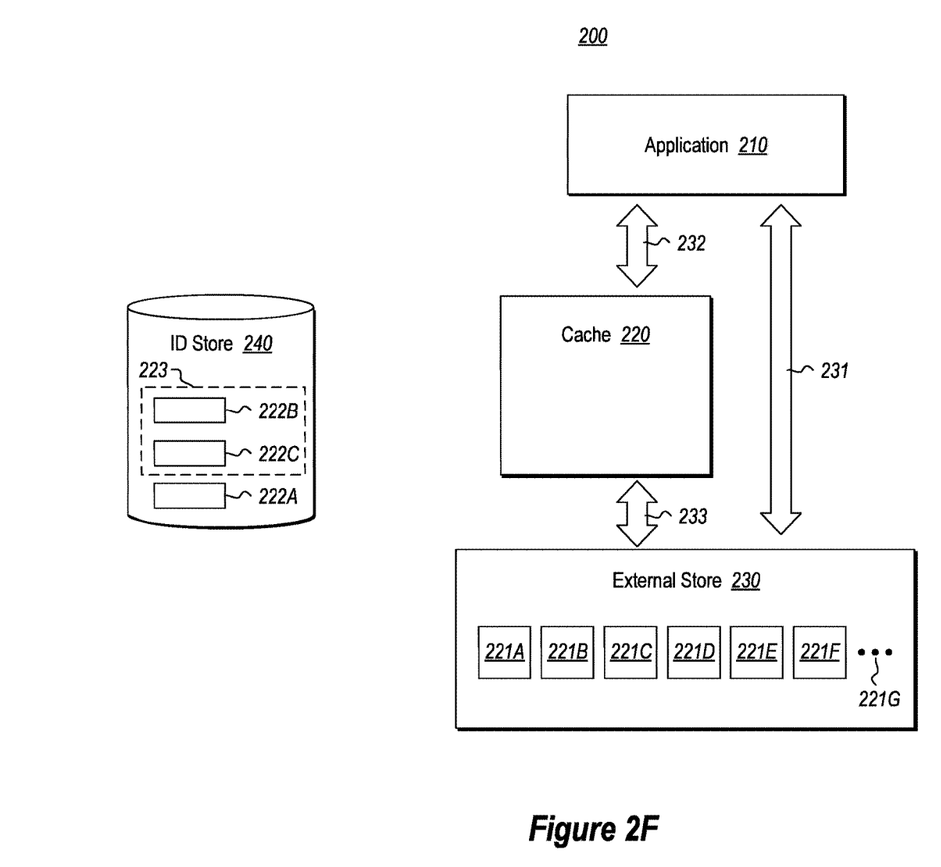
FIG. 2F illustrates a state of the environment of FIG. 2E, except now with the application again being operational.

The application is ultimately operated again (act 503) (e.g., potentially after moving and/or recovering the application). For instance, FIG. 2F is illustrated the same as FIG. 2E, except that now the application 210 is back up and running. Furthermore, while the application is operating (act 503), the system automatically accesses the cache portions from the external store in the order in which the corresponding cache portion states are sorted within the identifier store 240.

Accordingly, in this state of time of FIG. 2F, the application 210 operates normally and may thus read or write to or from the external store 230 (as represented by the bi-directional arrow 232). This is one way for the application cache 220 to be manually populated by the application 210 with either cache portions that were previously within the application cache 220 (e.g., at the time represented in FIG. 2A), or perhaps with new cache portions that were not previously within the application cache. This occurs as a result of normal operation (act 503) of the application 210. A second source of repopulating the application cache 220 occurs automatically by operation of the warming module 260 in the background, as the cache portion states within the identifier store 240 may be used to repopulate the application cache 220 to include the cache portions 221A, 221B, and 221C.

Figure 2G:
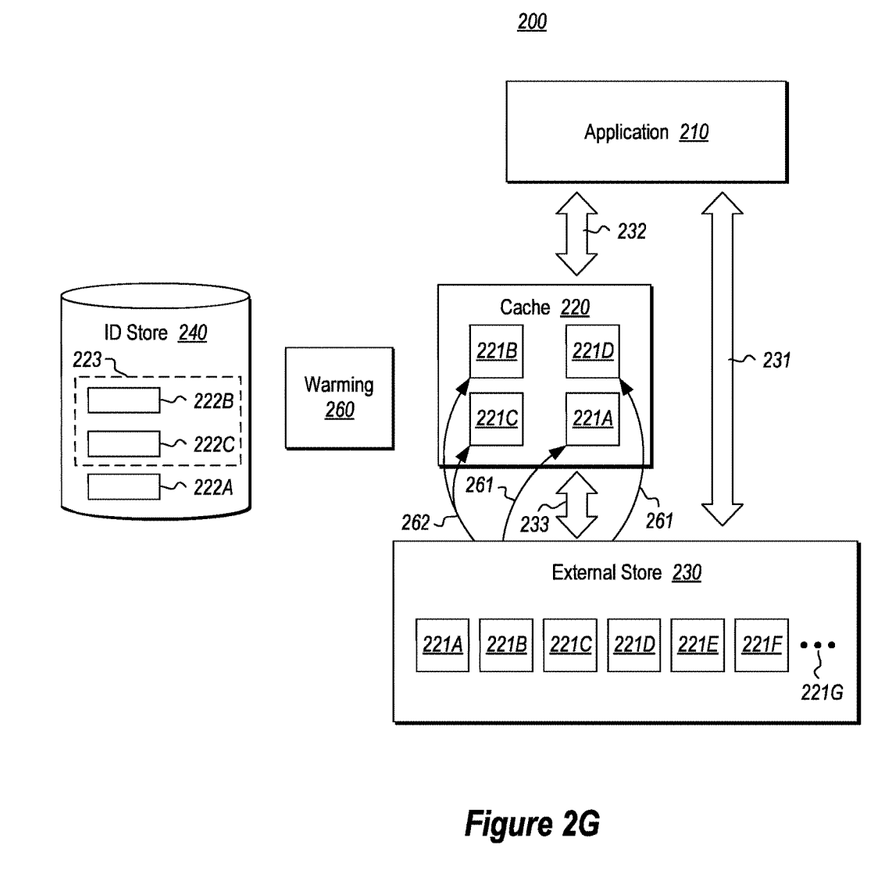
FIG. 2G illustrate a state of the environment of FIG. 2F, except now with the application cache having been repopulated through normal operation of the application as well as automatic background warming of the application cache.

FIG. 2G illustrates the environment 200 that is similar to FIG. 2F except that the sorting module 250 has performed its function and thus is no longer illustrated. However, a warming module 260 is illustrated as its function has begun. The normal operation (act 503) of the application takes priority over the automatic warming of the application cache (act 504) in the background. In FIG. 2G, three operations have occurred. First, during normal operation, cache portion 221D has been brought into the application cache 220 as represented by arrow 261. Once that normal operation completed, the recovery module had control to read sequence 600 to thereby populate cache portions 221B and 221C into the application cache 220 as represented by arrow 262. Furthermore, portions 601 through 606 were disregarded from the application cache (e.g., due to deallocation of their memory space). Finally, since there was no further normal operation of the application, the recovery module 260 recovered cache portion 221A into the application cache 220. That completed warming of the application cache 220 so as to have the same warm cache portions as the application cache 220 had in the state of FIG. 2A.

This increased the speed at which the application cache 220 was warmed. For instance, without this automatic warming, had the application thereafter requested cache portion 221B, then the application 210 would have had to read the cache portion 221B from the external store 230. Rather, because of the warming operation culminating in the state illustrated in FIG. 2G, the cache portion 221B may instead be acquired much more efficiently from the application cache 220. Furthermore, the warming did not adversely impact performance of the application since the warming did not block any normal read requests from the application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for recovering warmth of a cache of an application that has been subject to a running state change, the method comprising:
    during operation of an application in a first running state, identifying one or more cache portions included within an application cache that is associated with an application, each cache portion comprising a portion of data that has been cached into the application cache for later retrieval;
    capturing a state of each of the one or more cache portions that are included within the application cache at an instant in time, wherein capturing the state of each of the one or more cache portions includes capturing an identifier associated with each cache portion and storing each cache portion in a storage that is external from the application cache;
    detecting a change in running state of the application after the instant in time to a second running state;
    after detecting the change in running state of the application to the second running state, operating the application again in the first running state; and
    while the application is operating again in the first running state, performing at least the following:
        identifying at least one of the one or more captured cache portion identifiers; and
        based on identifying at least one of the one or more captured cache portion identifiers, automatically retrieving, from the storage that is external to the application cache, each cache portion associated with the identified at least one captured cache portion identifier, and storing each retrieved cache portion in the application cache, such that the application cache is automatically warmed for the first running state.

2. The method in accordance with claim 1, further comprising:
    sorting the cache portion identifiers using at least an estimated likelihood of imminent access.

3. The method in accordance with claim 2, wherein capturing the state also comprises capturing one or more hotness metrics associated with each of at least one of the cache portion identifiers, and wherein sorting the cache portion identifiers comprises estimating the likelihood of imminent access based on the corresponding captured one or more hotness metrics.

4. The method in accordance with claim 2, wherein the act of sorting also sorts by grouping a plurality of cache portions so as to be accessed through a same read operation.

5. The method in accordance with claim 1, wherein accessing from a source that is external to the application cache comprises:
    accessing a group of cache portions in a single read operation, wherein the group of cache portions includes multiple cache portions that were identified in the capture cache portion identifiers.

6. The method in accordance with claim 5, wherein the group of cache portions includes at least one cache portion that was not identified in the captured cache portion identifiers.

7. The method in accordance with claim 6, further comprising:
    disregarding the at least one cache portion that was not identified in the captured cache portion identifiers.

8. The method in accordance with claim 1, wherein the application is a database application.

9. The method in accordance with claim 1, wherein the application is a virtual machine.

10. The method in accordance with claim 1, wherein the application is an operating system.

11. The method in accordance with claim 1, wherein the location of the application cache after the changing of the running state is at a different location than prior to the changing of the running state.

12. The method in accordance with claim 1, wherein the location of the application cache after the changing of the running state is the same as prior to the changing of the running state.

13. The method in accordance with claim 1, wherein the changing of the running state of the application is a restarting of the application.

14. The method in accordance with claim 1, wherein the changing of the running state of the application is a changing a role of the application.

15. The method in accordance with claim 14, wherein the changing of the role of the application comprises changing the role of the application from secondary to primary.

16. The method in accordance with claim 1, wherein the changing of the running state of the application is stopping the application.

17. The method in accordance with claim 1, wherein the application cache is volatile cache.

18. The method in accordance with claim 1, wherein capturing a state of cache portion identifiers that are within an application cache of an application at an instant in time comprises taking a snapshot of the state of the cache portion identifiers.

19. A computer program product comprising one or more hardware storage devices having stored thereon computer-executable instructions that are executable by one or more processors of a computer system to recover warmth of a cache of an application that has been recently restarted, the computer-executable instructions including instructions that are executable to configure the computer system to perform at least the following:
    during operation of an application in a first running state, identify one or more cache portions included within an application cache that is associated with an application, each cache portion comprising a portion of data that has been cached into the application cache for later retrieval;
    capture a state of each of the one or more cache portions that are included within the application cache at an instant in time, wherein capturing the state of each of the one or more cache portions includes capturing an identifier associated with each cache portion and storing each cache portion in a storage that is external from the application cache;

detect a change in running state of the application after the instant in time to a second running state;

after detecting the change in running state of the application to the second running state, operate the application again in the first running state; and while the application is operating again in the first running state, perform at least the following:

identifying at least one of the one or more captured cache portion identifiers; and based on identifying at least one of the one or more captured cache portion identifiers, automatically accessing, from a source that is external to the application cache, each cache portion associated with the identified at least one captured cache portion identifier, and storing each retrieved cache portion in the application cache, such that the application cache is automatically warmed for the first running state.

20. A computer system comprising:

one or more processors; and one or more hardware storage devices having stored thereon computer executable instructions that are executable by the one or more processors to recover warmth of a cache of an application that has been recently restarted, the computer-executable instructions including instructions that are executable to configure the computer system to perform at least the following:

during operation of an application in a first running state, identify one or more cache portions included within an application cache that serves as a cache for the application, each cache portion comprising a portion of data that has been cached into the application cache for later retrieval;

capture a state of each of the one or more cache portions that are included within the application cache at an instant in time, wherein capturing the state of each of the one or more cache portions includes capturing an identifier associated with each cache portion and storing each cache portion in a storage that is external from the application cache;

detecting a change in running state of the application after the instant in time to a second running state;

after detecting the change in running state of the application to the second state, operate the application again in the first running state; and while the application is operating again in the first running state, perform at least the following:

identifying at least one of the one or more captured cache portion identifiers; and based on identifying at least one of the one or more captured cache portion identifiers, automatically retrieving, from the storage that is external to the application cache, each cache portion associated with the identified at least one captured cache portion identifier, and storing each retrieved cache portion in the application cache, such that the application cache is automatically warmed for the first running state.

* * * * *